Sept. 22, 1942.　　　F. G. WEISBECKER　　　2,296,301
KNITTED ARTICLE AND METHOD FOR MAKING SAME
Filed Feb. 3, 1938　　　5 Sheets-Sheet 1
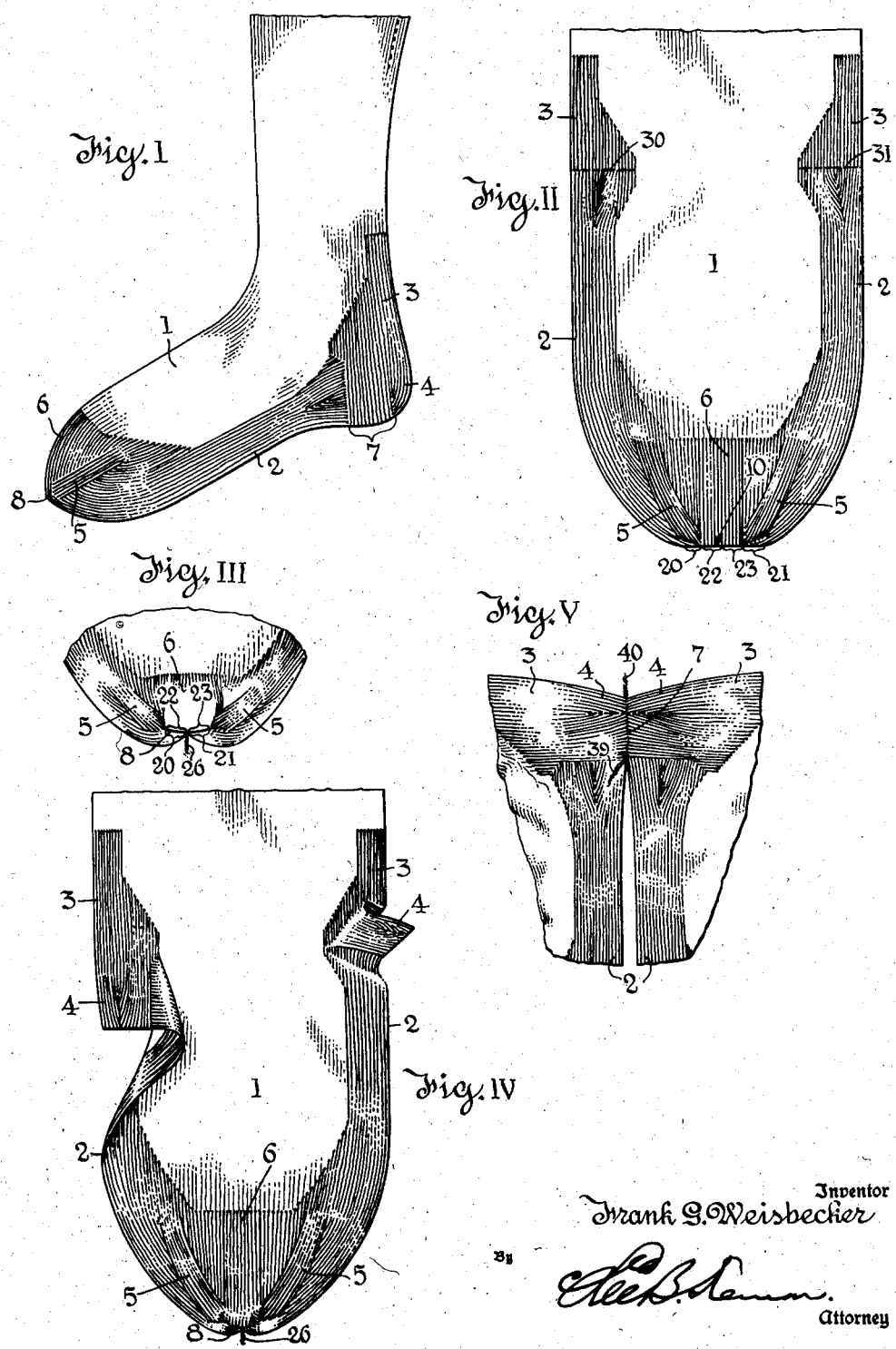

Sept. 22, 1942. F. G. WEISBECKER 2,296,301
KNITTED ARTICLE AND METHOD FOR MAKING SAME
Filed Feb. 3, 1938 5 Sheets—Sheet 2
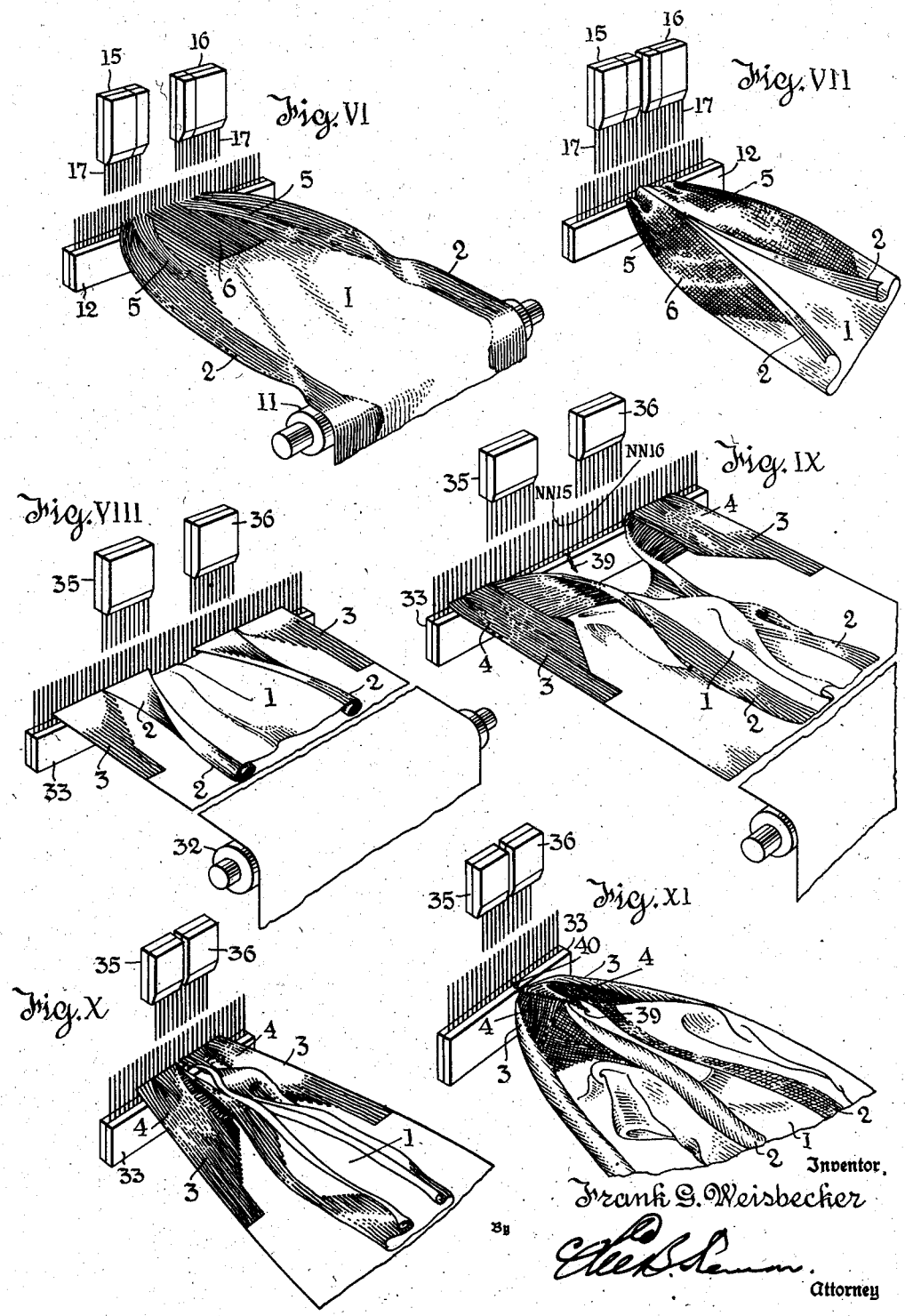
Inventor,
Frank G. Weisbecker
By
Attorney Sept. 22, 1942.  F. G. WEISBECKER  2,296,301
KNITTED ARTICLE AND METHOD FOR MAKING SAME
Filed Feb. 3, 1938  5 Sheets-Sheet 3
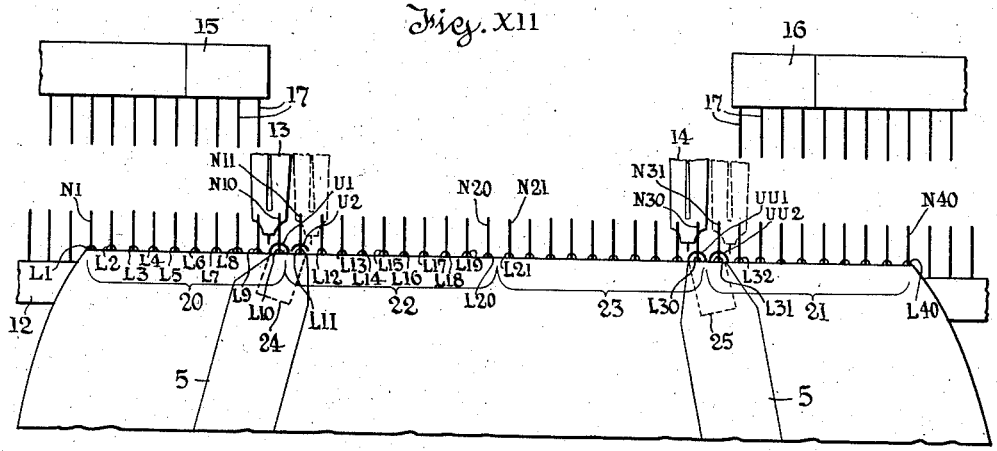
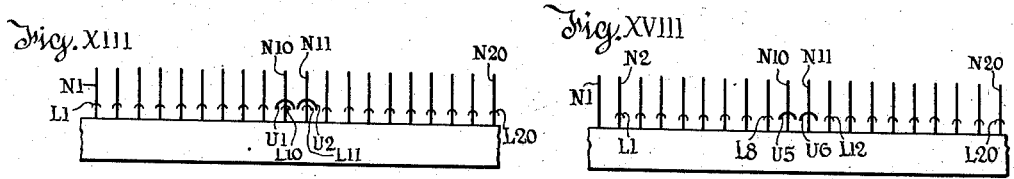
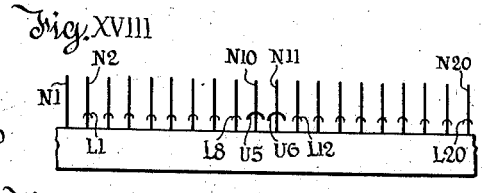
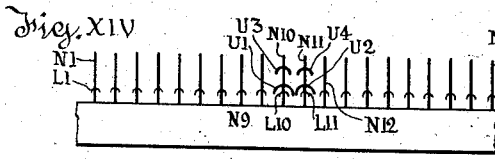
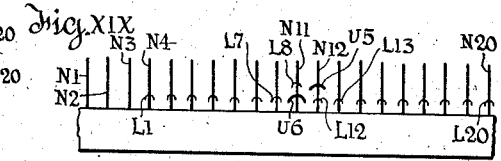
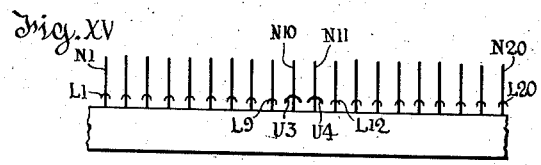
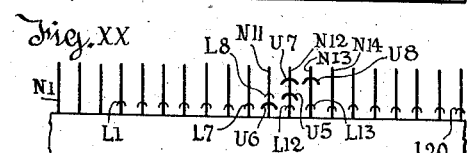
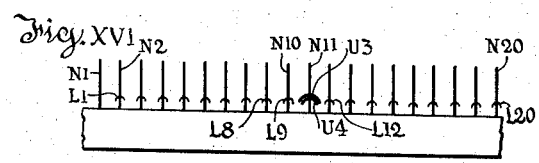
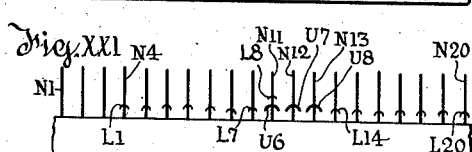
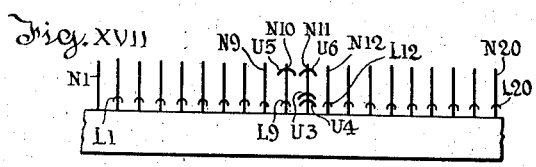
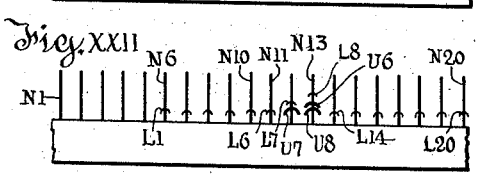
Inventor
Frank G. Weisbecker
By
Attorney Sept. 22, 1942.  F. G. WEISBECKER  2,296,301
KNITTED ARTICLE AND METHOD FOR MAKING SAME
Filed Feb. 3, 1938  5 Sheets-Sheet 4
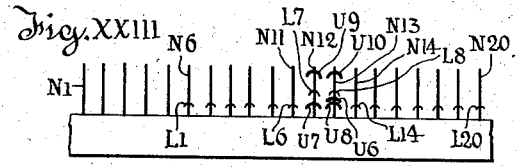
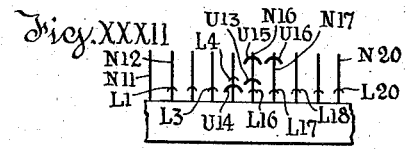
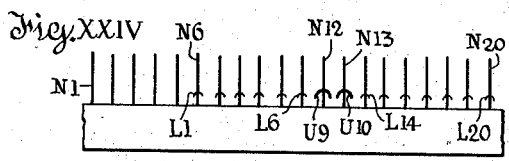
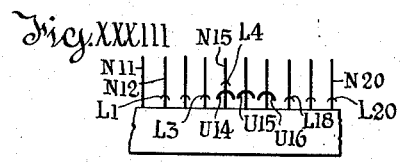
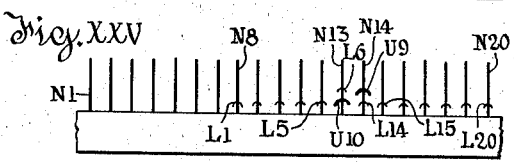
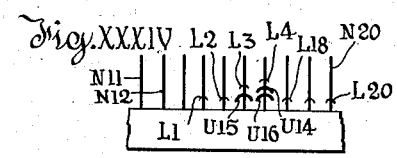
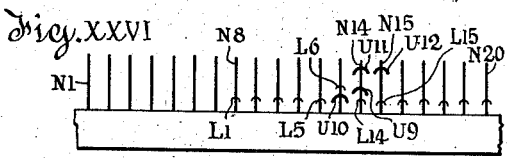
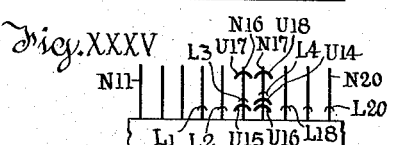
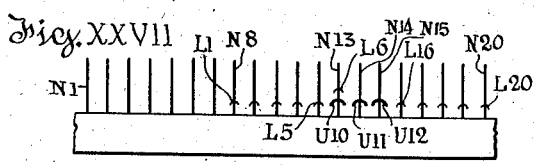
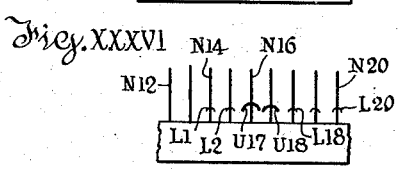
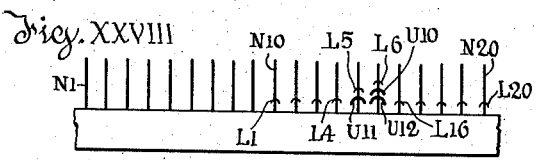
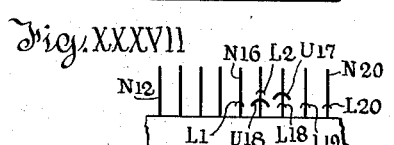
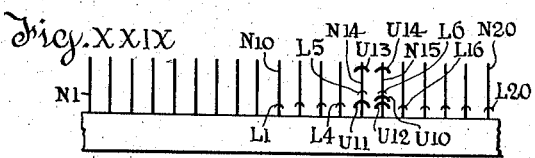
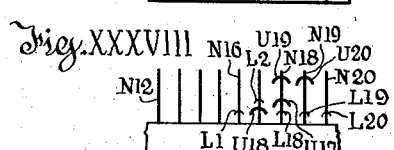
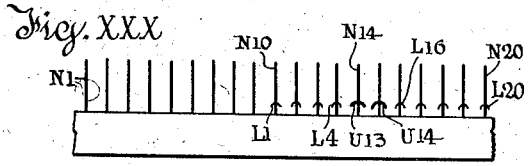
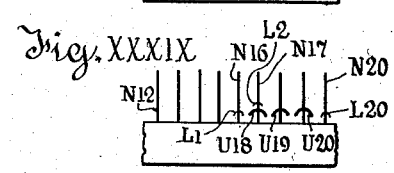
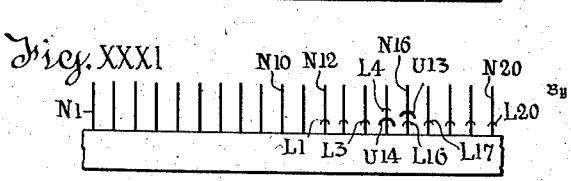
Inventor
Frank G. Weisbecker
By
Attorney Sept. 22, 1942.   F. G. WEISBECKER   2,296,301
KNITTED ARTICLE AND METHOD FOR MAKING SAME
Filed Feb. 3, 1938   5 Sheets—Sheet 5
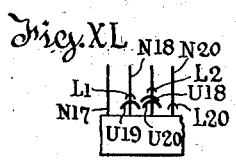
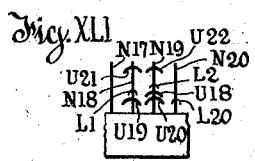
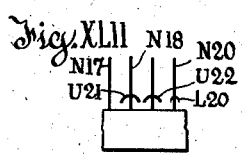
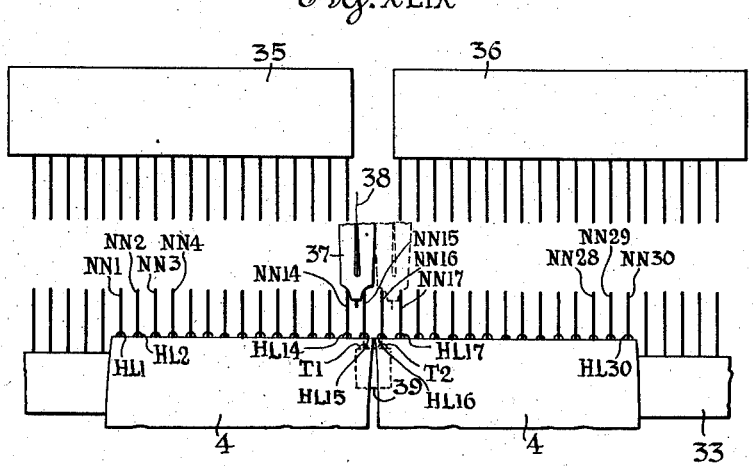
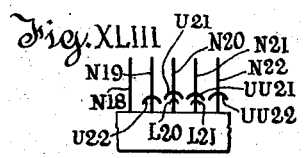
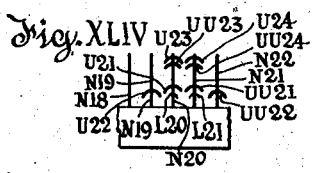
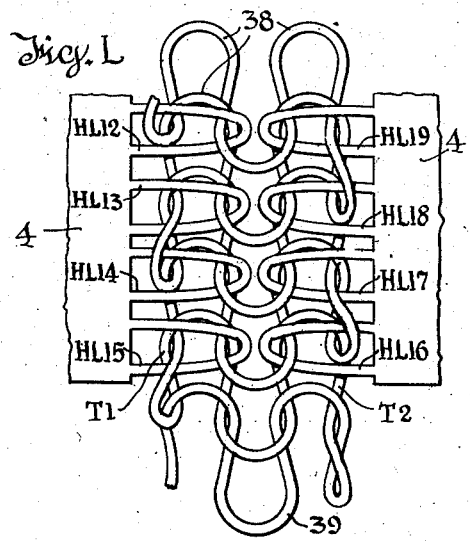
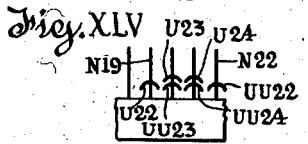
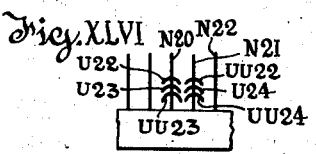
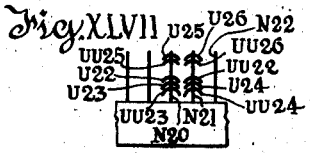
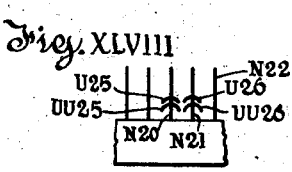
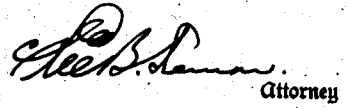
Inventor
Frank G. Weisbecker
By
Attorney Patented Sept. 22, 1942

2,296,301

UNITED STATES PATENT OFFICE 2,296,301

KNITTED ARTICLE AND METHOD FOR MAKING SAME

Frank G. Weisbecker, Glenside, Pa., assignor, by mesne assignments, to Hosiery Patents Incorporated, Lansdale, Pa., a corporation of Pennsylvania Application February 3, 1938, Serial No. 188,579

40 Claims. (Cl. 66—185)

This invention relates to knitted articles and their method of manufacture. More particularly, the invention relates to improvements in full-fashioned stockings and a method for seaming together portions of a stocking blank in making such stockings.

The method of this invention is especially suitable for forming a seam between the ends of stocking blank heel tabs and also a seam between the edge portions at the tip or end of a stocking blank toe. For purposes of illustration, the invention, therefore, will be described as applied to the joining of such portions of a full-fashioned stocking blank, but other applications of the invention will be readily understood from the description to follow.

Heretofore, the usual practice in manufacturing full-fashioned hosiery has been to produce the stocking blanks on knitting machines and to seam the stocking blank heel tabs and also the stocking blank toe end edge portions in a so-called "looping" operation on a looping machine, which makes a chain stitch. To prevent runs in the heel tabs and in the stocking toe during removal of the stocking blank to a looping machine, the heel tabs and toe are provided with a few extra courses, known as raveling courses. The heel tab raveling courses are removed by the operator when the heel tabs are on the looping machine and ready to be seamed together. The stocking toe raveling courses are also removed before the toe end edges are united by the looping machine.

There is a definite problem in joining either the stocking blank heel tabs or the stocking toe end edges which precludes the use of an ordinary sewing machine and which heretofore has required the use of a special looping machine. When the usual raveling courses are removed from the stocking blank, the wales of the heel tabs and of the toe terminate in free loops at the heel tab and toe ends. In other words, the ends of the heel tabs and the toe are then without a selvage, and particular care must be taken to so join these stocking parts that the possibility of their loops being left free to start a stocking run is substantially eliminated. To avoid such runs or unraveling, it is necessary that each of the described free loops or terminal wale loops be secured, bound or locked in the seam for the heel tab ends, or in the seam closing the toe end.

The present invention is an important improvement over the described prior practice of "looping" the stocking blank heel tabs and also the toe end edge portions. According to the embodiment disclosed herein, the invention, for example, makes it possible to knit and then seam together the stocking blank heel tabs on a conventional heeler knitting machine in a continuous operation. The toe end portions may also be seamed, as explained hereinafter, on the knitting machine which produces the stocking toe. For example, the toe of a stocking blank may be formed on a conventional footer knitting machine and then have its end or tip portions provided with a seam by the same machine, all in a continuous operation. If a conventional single unit straight knitting machine is being used for producing both the leg and foot of a stocking blank, the toe end portions may be united by the same knitting machine and without removal of the stocking blank therefrom.

The advantages secured by the present invention are numerous. The invention may be practiced to provide a knitted seam which is smoother and flatter than the seam produced by a looping machine. The seams produced in accordance with this invention may have substantially the flat and smooth appearance of stocking fabric produced by ordinary knitting and, in this respect, may be practically indistinguishable from the surrounding or adjacent knitted areas. The invention, furthermore, eliminates the need for the prior art looping machines and thereby effects a considerable saving, namely, the cost of looping machines. Operating expenses may be materially reduced by practicing this invention, as it eliminates the need for looping machine operators and looper menders. The substantial saving, which may be secured by practice of this invention, is further apparent when it is considered that knitting mills usually are equipped with a looping machine for each footer knitting machine. This invention also permits a saving of time in the production of hosiery, as it avoids removal of the stocking blanks from the legger, footer, single unit or other knitting machine, which knits the stocking blanks or portions thereof, to the looping machines for uniting the terminal wale loops of the heel tabs and stocking toe. In this way, the invention may actually assist a hosiery mill in increasing its rate of production. Another advantage of the present invention is that it provides a method whereby the usual raveling courses may be omitted and such waste of yarn may be avoided.

As ordinary yarn, of the character used in knitting the stocking blank, may also be used for seaming operations in the practice of this invention, the latter effects a further saving. The prior practice of "looping" portions of stocking blanks requires special and relatively expensive yarn, generally termed "looping" yarn. If such special yarn is not used in the looping operation, the stitches are apt to skip. The result would be so-called "open work," consisting of terminal wale loops free to start a run in their respective wales.

As the present invention may be carried out without the formation of the usual raveling courses, it secures an additional economy in yarn.

It is, therefore, an object of this invention to simplify the manufacture of knitted articles, and particularly with respect to uniting the edges of knitted fabric which are without a selvage.

Another object is to provide a novel method for seaming full-fashioned stocking blank edges, which are not provided with a selvage.

Another object is to provide knitted articles, and particularly the heels and toes of full-fashioned hosiery, with seams of improved character.

A further object is to secure a substantial saving with respect to the initial investment in hosiery mills, the operating expenses of such mills, and the manufacture of full-fashioned hosiery.

A still further object is to increase the rate of production in the manufacture of full-fashioned hosiery.

Other objects of this invention will be apparent from the following specification, the appended claims, and the accompanying drawings, wherein:

Fig. I is an elevational side view of a full-fashioned stocking having its toe end portions and also its heel tab end portions united in accordance with this invention.

Fig. II is a top plan view of one type of stocking foot blank produced on a single unit, full-fashioned hosiery knitting machine.

Fig. III is an elevational view of the stocking toe in Fig. I and shows the toe front edge portions united in accordance with this invention.

Fig. IV is a top elevational view showing the stocking foot of Fig. II in a later stage of manufacture.

Fig. V is a detail view showing the heel tabs (of Fig. IV) after they have been joined in accordance with this invention.

Figs. VI and VII are diagrammatic perspective views of portions of a conventional single unit straight knitting machine and portions of a stocking foot to illustrate progressive stages in the seaming of stocking toe edge portions according to this invention.

Figs. VIII to XI, inclusive, are diagrammatic perspective views of portions of a conventional heeler knitting machine and portions of a stocking blank to illustrate progressive stages in the manufacture and seaming of stocking blank heel tabs.

Figs. XII through XLVIII are diagrammatic views to illustrate one method of uniting the front edge portions of a stocking blank toe according to this invention, Fig. XII also being a front elevational view, on enlarged scale, of the machine parts and stocking toe of Fig. VI.

Fig. XLIX is a diagrammatic front elevational view of portions of a conventional heeler knitting machine, with the heel tab terminal wale loops of a stocking blank arranged thereon in the manner illustrated in Fig. X.

Fig. L is a diagrammatic detail view to show the relative arrangement of loops in a heel tab seam made in accordance with one embodiment of this invention.

Referring now to the drawings, Fig. I shows a full-fashioned stocking in which the foot is made from a blank of the style or type shown in Fig. II. The illustrated stocking and blank include such usual parts as the instep portion 1, the sole portions 2, the heel portions 3, the diamond points 5 and the toe portion 6, the diamond points 5 and the toe portion 6 terminating together at the front toe edge 10 (see Fig. II).

This invention, for purposes of illustration, is described in connection with the manufacture of a particular form of stocking blank (complete except as to heel tabs) on a conventional single unit straight knitting machine and the heel tabs for the stocking blank on a conventional heeler knitting machine It will be apparent, however, from an understanding of this disclosure that the present invention may be practiced in the production of stockings from other types of stocking blanks and that the stocking blank may be produced by means of separate conventional legger and footer knitting machines, or by means of conventional single unit straight knitting machines, and with or without a heeler knitting machine. The legger, footer and single unit machines, referred to, may be either single section machines for producing a single stocking blank at one time, or multi-section machines for simultaneously producing a number of stocking blanks.

To facilitate an understanding of this invention, Figs. VI, VII, and XII show certain portions of a conventional single unit full-fashioned hosiery knitting machine. This single unit machine may knit a substantially complete stocking blank including the foot portion of Fig. II and then join the toe front edge portions 20, 21, 22 and 23 to provide the knitted seam 8, all in a continuous operation. The illustrated portions of a conventional single unit machine comprise a take-up roll 11, a needle bar 12 having a series of needles, yarn carriers 13 and 14 (see Fig. XII), and two sets (15 and 16) of transfer fingers. These portions of the knitting machine are conventional, may perform their individual operations according to conventional practice, and may be controlled and operated by conventional mechanism. The needles of needle bar 12 may be controlled individually or in sets (each two adjacent needles constituting a set) by conventional presser bars (not shown). These presser bars may be selectively controlled in known manner to determine whether their associated needles are to remain idle or are to be operative in the knitting process.

It is the common practice to provide each knitting section of a single unit knitting machine with two sets (15 and 16) of transfer fingers, one set at each side of the knitting field. Each set consists of two transfer fingers as shown in Figs. VI, VII and XII (one finger having more transfer points 17 than the other one). In the practice of this invention, the two transfer fingers in a set (15 or 16) are preferably operated together and so relatively arranged that they will in effect act as a single transfer finger. For convenience, each set (15 or 16) of transfer fingers may and will be referred to hereinafter as "a transfer finger."

The conventional single-unit knitting machine, of which portions have been described, may proceed in the usual manner for the knitting of the stocking foot blank shown in Fig. II until the last course of the blank (the one constituting toe edge 10) is formed, and the blank is in the position shown in Figs. VI and XII ready to have the toe edge portions 20 to 23 united in accordance with this invention.

Heretofore, the practice, as previously explained, has been to continue the knitting operation beyond the toe edge 10 to provide a number of raveling courses (not shown). However, in the practice of this invention, the raveling courses may be, and preferably are, omitted.

*Knitting the toe seam*

To provide the knitted seam 8, outer toe edge portions 20 and 21 are united to inner toe edge portions 22 and 23 respectively. It will be understood that the combined extent of toe edge portions 20 through 23, inclusive, is the same as the length of the last course of the stocking foot blank, which course consists of a plurality of free or terminal wale loops, one for each wale terminating at toe edge 10.

The number of free or terminal wale loops at toe edge 10 varies with the size and style of stocking being knit. For the purposes of this description, the invention will be explained in connection with a toe edge 10 having forty free terminal wale loops, indicated at L1 through L40. It will be understood, of course, that the toe edge 10 usually has more than forty free loops, and that the present method of providing toe seam 8 may be substantially the same irrespective of the number of terminal wale loops in the toe edge 10. If the toe edge 10 has more than forty free loops, the method about to be described would be generally followed until the toe seam 8 is completed.

Each of the toe edge portions 20, 21, 22 and 23 preferably comprises the same number of loops. In the drawings, each of the toe edge portions 20, 21, 22 and 23 is shown as consisting of ten terminal wale loops. The drawings also show one of the diamond points 5 terminating in the terminal wale loops L10 and L11 at the adjacent ends of toe edge portions 20 and 22, and the other diamond point 5 terminating in the terminal wale loops L30 and L31 at the adjacent ends of toe edge portions 23 and 21 in Fig. XII. As illustrated in the drawings, the extremities of diamond points 5 are usually so arranged in conventional full-fashioned hosiery that the number of terminal wale loops between them in the last course of stocking toe 6 is the same as the total number of terminal wale loops outside of them in the same course. This arrangement of the diamond points 5 results in their extremities terminating at opposite ends of the completed knitted seam 8 as shown in Fig. III.

In forming toe seam 8, such as shown in Fig. III, for example, the toe edge portions 20 and 21 may be simultaneously united to toe edge portions 22 and 23, respectively, in similar manner by the single-unit knitting machine. The transfer finger 15 and yarn carrier 13 are used in the operations for joining toe edge portion 20 to toe edge portion 22, while the transfer finger 16 and yarn carrier 14 are used in similar operations for joining toe edge portion 21 to toe edge portion 23. The only differences in the two series of operations for uniting toe edge portions 20 and 21 to toe edge portions 22 and 23, respectively, may be that while the transfer finger 15 is transferring certain loops of toe edge portion 20 to the right (looking at Fig. XII), the transfer finger 16 is transferring corresponding loops of toe edge portion 21 to the left, and that when yarn carrier 13 is adjusted or shifted to the right (looking at Fig. XII) after alternate yarn laying operations, the yarn carrier 14 will be simultaneously adjusted or shifted the same extent to the left. In laying their yarn for knitting, yarn carriers 13 and 14 may travel simultaneously the same extent and in the same direction. As the two series of operations for uniting the outer toe edge portions 20 and 21 to the inner toe edge portions 22 and 23 are otherwise substantially the same, this invention will be readily understood from a full description of the manner in which toe edge portion 20 is united to toe edge portion 22 and a somewhat limited description concerning the operations for uniting toe edge portions 21 and 23.

The toe edge portion 20 is united to toe edge portion 22 by means of an additional yarn, which is fed to certain needles in the desired order by the yarn carrier 13 of Fig. XII. In order that this additional yarn, which hereinafter will be termed the seaming yarn, will have its first-laid end bound into the completed stocking, the yarn carrier 13 preferably begins its operation several courses prior to the knitting of the last course in the stocking toe 6 and forms what may be called a tail 24, which is knit into and simultaneously with the last few courses of the stocking toe 6. The yarn carrier 14 similarly supplies its seaming yarn in forming the tail 25. Each course of the tails 24 and 25 may comprise only two loops and be knit on only two needles. The method of knitting each of the tails 24 and 25 may be similar to that generally followed in conventional plating operations.

In the event the stocking toe 6 is provided with conventional diamond points 5 as shown in the drawings, the tails 24 and 25 are preferably knit so that they extend along the center of the diamond points 5 as shown in Fig. XII. Irrespective of whether the stocking blank is of the type having diamond points, the course of the tail 24, for example, at toe edge 10 is preferably knit on the needles which carry the adjacent end loops L10 and L11 of toe edge portions 20 and 22. In Fig. XII, these needles on which the last-formed course of the tail 24 is knit are the needles designated as N10 and N11.

Figures XIII through XLVIII illustrate one embodiment of the present method for uniting the toe loops L1 through L10 to the toe loops L11 through L20, and it will be understood that with the exceptions explained above, the loops L31 through L40 in toe edge portion 21 are similarly united to the loops L21 through L30 in toe edge portion 23. The same relative arrangement of needles N1 through N20 and loops L1 through L20, U1 and U2 are shown in Figs. XII and XIII.

When the last course of both the stocking blank toe 6 and the tails 24 and 25 is knit, the stocking blank toe 6 and the tails 24 and 25 will appear as shown in Fig. XII with their last course of loops arranged on needles N1 to N40 inclusive. It will be noted here that the toe edge portions 20 through 23 are arranged on an equal number of needles, namely ten, in the drawings. Needles N1 through N40 now carry loops L1 through L40, while needles N10, N11, N30 and N31 also carry tail loops U1, U2, UU1, and UU2 respectively. Loops designated as L1 through L40 are the loops formed to complete the last course of the stocking toe in usual manner and loops U1, U2, UU1 and UU2 are loops resulting from the formation of the last course in the tails 24 and 25 from the seaming yarn laid by yarn carriers 13 and 14 respectively.

In Figs. XII through XLVIII, the loops L1 through L40, which comprise the last course of the stocking blank toe 6, are represented by small half-circles. In the same figures, the loops formed from the seaming yarns of yarn carriers 13 and 14 are represented by the larger half-circles. The loops formed from the seaming yarn of yarn carrier 13 are marked U1, U2, U3, U4, etc., and the loops formed of the seaming yarn from yarn carrier 14 are marked UU1, UU2, etc. In each of the Figs. XIV through XLVIII, where more than one loop occurs on a particular needle, the figure shows the order in which the loops of that needle have been placed thereon. For example, in Fig. XVII three loops U3, U4 and U6 are shown on needle N11. The loop U4 being the first one placed on the needle N11 is shown in the lowermost position on the needle N11 and the loop U6 being the last one placed on the needle N11 is shown above the loops U3 and N4. The loops of seaming yarn newly laid by a yarn carrier (for example see loops U3 and U4 in Fig. XIV and loops U5 and U6 in Fig. XVII) are shown near the top of their respective needles when the latter also carry previously formed loops which are ready to be pressed off.

When the stocking blank has reached the stage of development shown in Figs. XII and XIII, it is in condition to have its toe edge portions 20 and 21 united to toe edge portions 22 and 23 respectively. Yarn carriers 13 and 14 now proceed to lay yarn for a plurality of courses, each course comprising two loops and being knitted on two needles, the transfer fingers 15 and 16 being operated prior to yarn laying operations in the manner now to be described.

With the stocking blank on the machine as shown in Figs. XII and XIII, yarn carrier 13 is shifted from the full line position of Fig. XII to the dotted line position of the same figure to lay its seaming yarn along needles N10 and N11 so that the usual sinkers and dividers (not shown) may form loops U3 and U4 about the needles N10 and N11 (see Fig. XIV). Loops L10, U1, L11 and U2 are now pressed off needles N10 and N11 in the usual manner. It will be noted that the loops U1 and U2 constitute the last course of the tail 24. The arrangement of loops on the needles now appears as shown in Fig. XV. The transfer finger 15 (of Fig. XII) now lifts the loops L1 through L9 and loop U3 from needles N1 through N10, transfers them to the right a distance of one needle, and places them on needles N2 through N11 (see Fig. XVI). Yarn carrier 13 now moves from the dotted line position of Fig. XII to its full line position (same figure) to lay yarn for forming loops U5 and U6 on needles N10 and N11 (see Fig. XVII). Loops L9, U3 and U4 are now pressed off needles N10 and N11, and the latter are left with loops U5 and U6 as shown by Fig. XVII. The loops on needles N2 through N10 (see Fig. XVIII) are now transferred to the right a distance of two needles by transfer finger 15 and placed on needles N4 through N12 (see Fig. XIX). The yarn carrier 13 is now operated to lay along needles N12 and N13 the seaming yarn which is to form the loops U7 and U8 of Fig. XX.

It will be noted here that in Fig. XVII the new loops U5 and U6 are formed on needles N10 and N11, whereas in Fig. XX, the new loops U7 and U8 are formed on needles N12 and N13. The yarn carrier 13 has, therefore, been shifted to the right (looking at Fig. XII) a distance of two needles between the operations represented by Figs. XVII and XX. This shifting of the yarn carrier 13 a distance of two needles occurs after alternate courses, so that during the process of uniting the toe edge portions 20 and 22 (see Fig. XII), the yarn carrier 13 lays its yarn along the same two needles (for example needles N10 and N11) for two successive courses, and along the next two adjacent needles (for example needles N12 and N13) for the next two courses. This periodic adjustment of the yarn carrier 13 to the right (Fig. XII) for a distance of two needles continues until the toe seam 8 is completed. The adjustment of the yarn carrier 13 after alternate course laying operations may occur at any suitable time between the successive yarn laying operations.

The presser bars (not shown, but described above) are so controlled that only those needles of the group N1 through N20 are rendered operative for any particular course of the seaming yarn from yarn carrier 13, which are fed with seaming yarn by the yarn carrier 13 during that particular course. For example, the two courses of seaming yarn just described and represented by Figs. XIV through XIX are formed on needles N10 and N11, which are rendered operative for knitting by their respective presser bars. During the formation of such two courses (see Figs. XIV through XIX), the needles N1 through N9 and N12 through N20 are left idle by proper positioning of their respective presser bars. The presser bars for the needles N21 through N40 are similarly controlled, and the knitting of the seaming yarn from yarn carrier 14 progresses along the needles N31 through N21 in the same manner that the knitting of the seaming yarn of yarn carrier 13 progresses along the needles N10 through N20.

Referring again to Fig. XX, the loops U5, L12 and L13 are pressed off needles N12 and N13, which now are left with only loops U7 and U8 (see Fig. XXI). The loops on needles N4 through N11 are now transferred to needles N6 through N13 (see Fig. XXII). New loops U9 and U10 are then formed on needles N12 and N13 (see Fig. XXIII), after which loops L7, L8, U6, U7 and U8 are pressed off, so that needles N12 and N13 are left with only the newly formed loops U9 and U10 (see Fig. XXIV).

The loops on needles N6 through N12 are now transferred to the right a distance of two needles, the resulting arrangement of loops being shown in Fig. XXV. New loops U11 and U12 of seaming yarn are next formed on needles N14 and N15 (see Fig. XXVI), after which loops L14, L15 and U9 are pressed off needles N14 and N15, the resulting arrangement of loops on the needles being illustrated in Fig. XXVII.

The loops on needles N8 through N13 are then transferred by transfer finger 15 to the right a distance of two needles to provide the arrangement of loops illustrated by Fig. XXVIII. New loops U13 and U14 of seaming yarn are then formed on needles N14 and N15. Then loops L5 and L6, U10, U11 and U12 are pressed off needles N14 and N15, the resulting arrangement of loops on the needles being shown in Fig. XXX.

The loops on needles N10 through N14 are next transferred a distance of two needles as illustrated by Fig. XXXI, and new loops U15 and U16 of seaming yarn from yarn carrier 13 are formed on needles N16 and N17 as shown by Fig. XXXII. Then the loops L16, L17 and U13 (of Fig. XXXII) are pressed off needles N16 and N17 to leave the loops remaining on the needles as shown by Fig. XXXIII.

A transfer of the loops on needles N12 through N15 a distance to the right of two needles will now leave the loops on the needles as shown by Fig. XXXIV. After new loops U17 and U18 are formed on needles N16 and N17 (as shown by Fig. XXXV), loops L3, L4, U14, U15, and U16 are pressed off needles N16 and N17, the resulting arrangement of loops on the needles N14 through N20 being illustrated by Fig. XXXVI.

The loops on needles N14 through N16 are transferred a distance of two needles, whereby all of the loops remaining on the needles N12 through N20 will appear as shown in Fig. XXXVII. As illustrated in Fig. XXXVIII, new loops U19 and U20 of seaming yarn from yarn carrier 13 are next formed on needles N18 and N19. The loops L18, L19 and U17 are next pressed off needles N18 and N19 leaving only loops U19 and U20 on needles N18 and N19 as shown by Fig. XXXIX.

The loops on needles N16 and N17 in Fig. XXXIX are now transferred a distance of two needles, so that all the loops remaining on the needles are arranged as shown by Fig. XL. New loops U21 and U22 are then formed on needles N18 and N19 as shown in Fig. XLI, and loops L1, L2, U18, U19 and U20 are pressed off needles N18 and N19, whereby needles N18, N19 and N20 are left with only the loops U21, U22, and L20 as shown in Fig. XLII.

Loop U21 is next transferred from needle 18 a distance of two needles, that is, to needle 20 (see Fig. XLIII). During the foregoing transfer and yarn laying operations of transfer finger 15 and yarn carrier 13, the transfer finger 16 and yarn carrier 14 were performing similar operations, so that when the stage of knitting indicated by Fig. XLIII is reached, the only toe loops remaining on the needles N1 through N40 are loops L20 and L21 which are positioned on needles N20 and N21 respectively, and the newly formed loops U22, U21, UU21, and UU22 are carried by needles N19, N20, N21 and N22 respectively (see Fig. XLIII). It will be understood, here, that the seaming yarn of loops U21 and U22 is laid by yarn carrier 13 and the seaming yarn of loops UU21 and UU22 by yarn carrier 14 (of Fig. XII). The stocking blank is now suspended from the needles as shown in Fig. VII.

The next step will be to operate yarn carriers 13 and 14 together or otherwise, so that they will both lay their yarn along needles N20 and N21 to provide two new loops on each of these needles, yarn carrier 13 laying the seaming yarn for loops U23 and U24 and yarn carrier 14 laying the seaming yarn for loops UU23 and UU24. Loops L20, L21, U21 and UU21 are now pressed off needles N20 and N21, the loops remaining on the needles N19 through N22 being shown in Fig. XLV. Loops U22 and UU22 are next transferred to needles N20 and N21 respectively (see Fig. XLVI), transfer finger 15 (Fig. XII) effecting the transfer of loop U22, and transfer finger 16 (Fig. XII) effecting the transfer of loop UU22.

Yarn carriers 13 and 14 now continue to lay their yarn together on needles N20 and N21 for a plurality of courses without intervening transfer operations until a tail 26 (see Fig. III) of sufficient length is formed beyond the toe seam 8 joining loops L1 through L40. Figs. XLVI through XLVIII illustrate the procedure in making one course of the tail 26, the other courses, in the desired number, being formed in similar manner. With loops U22, U23, and UU23 on needle N20, and loops UU22, UU24, and U24 on needle N21 (see Fig. XLVI), yarn carrier 13 (of Fig. XII) is operated to lay its seaming yarn for forming loops U25 and U26 on needles N20 and N21 respectively, and yarn carrier 14 is operated to lay its yarn for forming loops UU25 and UU26 on needles N20 and N21 respectively (see Fig. XLVII). The loops U22, U23, UU23, UU22, U24, and UU24 are now pressed off needles N20 and N21. This will leave only loops UU25, U25, U26 and UU26 on needles N20 and N21 as illustrated in Fig. XLVIII. These operations explained in connection with Figs. XLVI through XLVIII are now repeated until the desired length of tail 26 (Fig. III) is secured. This tail 26 is bound into the usual seam when it is later provided to unite the usual selvages of the toe 6 and sole 2 in completing the stocking shown in Fig. I.

Variations of the foregoing method will be readily apparent from an understanding of this invention. For example, each of the yarn carriers 13 and 14 may lay yarn along more than two needles in each of its yarn laying operations and thereby provide longer courses for the seaming yarn, if extra strength is desired for the toe union. As an illustration, yarn carrier 13 might be operated to provide seaming yarn for loops on the four needles N9, N10, N11, and N12 in Figs. XIV and XVII, on the four needles N11, N12, N13 and N14 in Figs. XX and XXIII and so on until the seaming together of loops L1 through L20 is completed. The tail 26 may then be formed on either four needles or two needles as may be desired. With this four needle yarn laying movement of the yarn carriers 13 and 14, they may still be shifted toward each other a distance of two needles after alternate yarn laying operations, as explained above, and the transfer fingers 15 and 16 may execute their operations in the manner explained in connection with Figs. XV through XLIII. The transfer operation of Figs. XLV and XLVI may be omitted if the tail 26 is to be formed on four needles.

Figs. XIV to XLIV, inclusive, show how the ten loops of toe edge portion 20 are united to the ten loops of toe edge portion 22 in eleven courses of the seaming yarn from yarn carrier 13. In other words, there are approximately the same number of courses of the seaming yarn in the seam between toe edge portions 20 and 21 as there are terminal wale loops in one of these two toe edge portions. The method of this invention, however, may obviously be carried out by providing a greater number of courses in uniting the toe edge portions, but this would require more yarn, additional time for performance of the method, and involve a more complicated operation of the knitting machine.

In the method explained in connection with Figs. XII through XLVIII, there are certain characteristics which may be pointed out to assist an understanding of this invention. Of the loops L1 through L20, only the loops L1 through L9, which are loops in the outer toe portion 20, are transferred during the described method. The loops L10 through L20 remain on their respective needles N10 through N20 until they are pressed off at the proper time. All of the transfer operations in the process of uniting loops L1 through L20 are performed by transfer finger 15. This transfer finger 15 in each of the transfer operations of the Figs. XV through XL transfers all of the loops L1 through L9 on the needles at the time of the transfer and also one loop formed of the seaming yarn from yarn carrier 13. The transfer finger 15, in each transfer operation, also transfers loops from fewer needles than it did in its preceding transfer operation. In the transfer operation between Figs. XV and XVI, loops were transferred from ten needles (needles N1 through N10). In the operation between Figs. XVIII and XIX, the transfer was made from nine needles (N2 through N10). For the operation following Fig. XXI, the transfer was made from eight needles (N4 through N11). In arranging the loops as shown in Fig. XXV, the transfer was made from seven needles (N6 through N12). This reduction, between successive transfer operations, of one needle in the number of needles from which a transfer is made is continued until the stage of operations indicated by Fig. XLIII is reached. In arranging the loops as shown in Fig. XLIII, the transfer finger transferred a single loop (U21) from a single needle (N18). In arranging the loops as shown in Fig. XLVI during the last transfer operation, the transfer finger 15 (of Fig. XII), again transferred a single loop (U22) from a single needle (N19).

While transfer finger 15 is working loops L1 through L9 and certain of the loops of the seaming yarn from yarn carrier 13, such as loops U3 (Figs. XV and XVI) and U5 (Figs. XVIII and XIX), toward the right (looking at Fig. XII for example), transfer finger 16 is similarly and simultaneously working loops L32 through L40 and certain loops of the yarn from yarn carrier 14 (for example, loops corresponding to loops U3 and U5) toward the left (looking at Fig. XII). It will, therefore, be understood that, in each transfer operation of the machine, transfer fingers 15 and 16 may operate on the same number of loops, on the same number of needles, but in different directions, that is towards each other.

Forming the heel tabs

After the toe seam 8 and the tail 26 of Fig. III have been knitted on the single unit full-fashioned machine, as explained above, the stocking blank may then be removed therefrom and transferred according to known practice to a conventional topping stand (not shown). With the foot of the stocking blank properly supported by the topping stand (not shown), the blank is cut along lines 30 and 31 to separate the heel portions 3 from the adjacent sole portions 2. The stocking blank may now have the heel tabs 4 knitted to heel portions 3 and the sole portions 2 simultaneously knitted to the heel tabs 4. The heel tabs 4 may be knit on a conventional heeler knitting machine, certain parts of which are illustrated in the drawings to facilitate an understanding of this invention. The parts of a conventional heeler knitting machine shown in Figs. VIII through XI, and XLIX comprise a take up roll 32, a needle bar 33, two transfer fingers 35 and 36, and a yarn carrier 37. It will be understood that the conventional heeler knitting machine also has the usual sinkers, dividers and knock-over bits (not shown) to cooperate with the needles in forming courses of loops. The needles of needle bar 33 may be controlled individually or in pairs by selectively operated conventional presser bars (not shown). These presser bars in known manner (as previously explained) determine whether their associated needles are to remain idle or to be operative at any particular time in the knitting process. In positioning the foot of the stocking blank on the conventional heeler knitting machine for knitting the heel tabs 4, the terminal wale loops of the separated heel portions 3 and sole portions 2 are placed on the needles of the needle bar 33 in the manner indicated by Fig. VIII. Each terminal loop of the separated heel portions 3 and sole portions 2 is placed on a separate needle, and the terminal loops of the heel portions 3 may be placed on the groups of needles adjacent, and outside of, the needles supporting the terminal loops of the sole portions 2 (see Fig. VIII).

Knitting now proceeds in the usual manner, on those needles of needle bar 33 which received the terminal loops of heel portions 3, until heel tabs 4 are knit. The yarn of each heel tab 4 is laid by a separate yarn carrier (not shown) and is sunk and divided between the needles by the usual sinkers and dividers (not shown) in accordance with well known conventional practice.

During the knitting of heel tabs 4, the presser bars (not shown but referred to above) are so positioned so that the needles which support the heel portions 3 in Fig. VIII are rendered operative, and the needles supporting the sole portions 2 in Fig. VIII are left idle.

The end loops of sole portions 2 are knit to the heel tabs 4 during formation of the latter as the result of a series of transfer operations. These transfer operations are performed by transfer fingers 35 and 36, the transfer finger 35 operating on the terminal loops of left sole portion 2 (Fig. VIII) and the transfer finger 36 similarly operating on the terminal loops of the other sole portion 2. Each transfer finger 35 and 36 in each operation transfers outwardly those terminal loops of its respective sole portion 2 which are held by the needles prior to that particular transfer operation. In forming each course of a heel tab 4, the end loops of sole portion 2 on adjacent needles are transferred outwardly a distance of one needle. In each transfer operation of the transfer fingers 35 and 36, each transfer finger is effective to place one end loop of the respective sole portion 2 on the adjacent outermost needle of the group supporting the heel tab 4 adjacent the loops being transferred. It will, therefore, be understood that the individual transfer operations are similar to the transfer operations in so-called "one needle" narrowing. By so transferring loops of sole portions 2 in each transfer operation, one of the end loops in each sole portion 2 will be knitted into each course of the respective heel tab 4. The number of courses in each heel tab 4 is preferably the same as the number of terminal loops in the adjacent sole portion 2. As a result, all the terminal loops in a sole portion 2 will be knitted to the adjacent heel tab 4 when the latter is completed, and each course of a heel tab 4 will be knitted to a separate end loop of the adjacent sole portion 2. The appearance of the stocking blank at the completion of heel tabs 4 is shown by Figs. IV and IX, the latter also showing the heel tabs 4 of the stocking blank arranged on the heeler knitting machine. The heel tabs 4 are now carried by the same needles which supported the terminal loops of heel portions 3 in Fig. VIII. The described procedure for providing the blank of Fig. II with the heel tabs 4 between heel portions 3 and sole portions 2 is conventional practice, and will, therefore, be readily understood without further explanation.

Conventional practice would now call for the formation of raveling courses on the end of each heel tab 4 to facilitate a subsequent looping operation, but these raveling courses may be eliminated in following this invention.

*Knitting the heel tab seam*

During the formation of the last few courses of heel tabs 4, knitting of a separate yarn 38 (hereinafter termed the seaming yarn 38) is initiated on needles designated as NN15 and NN16 (Fig. XLIX) to form a tail 39 (see Figs. IX and XLIX). Upon completion of the last course in each of the heel tabs 4, the transfer fingers 35 and 36 inwardly transfer the heel tabs 4 from their positions illustrated in Fig. IX to the positions illustrated in Figs. X and XLIX. As a result of this transfer operation, the innermost loop in the last course of each heel tab 4 is placed on one of the two needles NN15 and NN16 which have knit the tail 39. That is, heel tab terminal wale loops HL15 and HL16 are placed on needles NN15 and NN16, respectively, which latter already carry loops T1 and T2 constituting the last-formed course of tail 39. The remaining heel tab terminal loops HL1 through HL14 of the left heel tab 4 (see Fig. XLIX) are now on needles NN1 through NN14, and the remaining heel tab terminal loops HL17 through HL30 of the other heel tab 4 are now on needles NN17 through NN30. The heel tabs 4 are now in position to be seamed together.

The procedure for seaming the heel tabs 4 comprises knitting on needles NN15 and NN16 a plurality of courses from seaming yarn 38 as a continuation of the tail 39, and transferring certain of the heel tab terminal wale loops HL1 through HL14 and HL16 through HL30 during the formation of each course from seaming yarn 38. During these operations for seaming the heel tabs 4, the needles NN15 and NN16 are rendered operative and the needles NN1 through NN14 and NN17 through NN30 are left idle by proper positioning of their respective presser bars (not shown). It will also be understood that although each of the heel tabs 4 is shown in Fig. XLIX as having fifteen terminal wale loops (loops HL1 through HL15 in the left heel tab 4 and loops HL16 through HL30 in the right heel tab 4) in its last course, each heel tab 4 may in actual practice have a greater number of loops. Irrespective of the length of the last course in each heel tab 4, the general method being described may be followed until all the terminal wale loops in the heel tabs 4 are joined to provide the heel tab seam 7 of Figs. I and V.

With the heel tabs 4 arranged as shown in Fig. XLIX, yarn carrier 37 is shifted from the full-line to the dotted line position (see Fig. XLIX) to lay the seaming yarn 38 for forming a course of loops on needles NN15 and NN16, when the usual sinkers and dividers (not shown) are projected between the needles. For purposes of description, this course of loops formed from united yarn 38 after the heel tabs 4 assume the position of Fig. XLIX will be termed the "first course" in seaming the heel tabs 4, although it will be understood such first course is a continuation of the courses in tail 39. The loops HL15, HL16, T1 and T2 of Fig. XLIX are now pressed off needles NN15 and NN16 leaving only the loops of said "first course" of seaming yarn 38 on those needles.

Transfer finger 35 now lifts the loops HL1 through HL14 from needles NN1 through NN14, transfers them to the right (Fig. XLIX) a distance of one needle, and places the lifted loops on needles NN2 through NN15. At the same time, transfer finger 36 similarly transfers loops HL17 through HL30 to needles NN16 through NN29. The yarn carrier 37 is now moved from the dotted line position to the full line position of Fig. XLIX to lay the seaming yarn 38 in the formation of another course (which will be called the "second course") of loops on needles NN15 and NN16. The loops HL14 and HL17 together with said "first course" of loops of seaming yarn 38 are now pressed off needles NN16 and NN17, so that the latter are left only with the loops of said "second course" of seaming yarn 38. This series of transfer, loop forming, and pressing off operations is repeated until all of the loops HL1 through HL30 have been transferred to needles NN15 and NN16 and knitted into the courses of seaming yarn 38.

It will now be understood that the fifteen loops HL15 through HL1 are successively placed, in the order named, on needle NN15 by a series of fifteen transfer operations, while a similar number of transfer operations are being simultaneously performed to place in succession the loops HL16 through HL30, in the order named, on needle NN16. There are, therefore, fifteen transfer operations to be performed by each transfer finger 35 and 36. In each transfer operation, after the heel tabs 4 are positioned as in Fig. XLIX, the transfer fingers 35 and 36 travel toward each other a distance of one needle. The individual transfer operations of a transfer finger may be executed in accordance with the conventional practice which is followed in so-called "one needle" narrowing. The number of heel tab terminal loops transferred by transfer fingers 35 and 36 is steadily reduced. For example, in placing the heel tabs 4 as shown in Fig. XLIX, each transfer finger (35 and 36) transfers fifteen terminal loops. In the next transfer operation, each transfer finger transfers fourteen terminal loops, transfer finger 35 transferring the loops HL1 through HL14 from needles NN1 through NN14 and the transfer finger 36 transferring the loops HL17 through HL30 from needles NN17 through NN30. In each subsequent transfer, each transfer finger (35 and 36) transfers one less terminal loop than it did in the immediately preceding transfer operation. Therefore, when the fifteenth or last transfer operation is reached, the transfer finger 35 will transfer only terminal loop HL1 from needle NN14 to needle NN15 and the transfer finger 36 will simultaneously transfer terminal loop HL30 from needle NN17 to needle NN16. After the last transfer operation, the yarn carrier 37 continues its operation until a plurality of additional courses of seaming yarn 38 are knit to provide a tail 40 beyond the heel tab seam 7. Before the tail 40 is removed from the needles, the stocking blank will appear on the heeler knitting machine as shown in Fig. XI.

The stocking blank, after removal from the heeler knitting machine, may be sewed in conventional manner to provide the usual seams for uniting the opposite selvages of the stocking blank extending between the toe and heel tab seams 8 and 7, and the opposite selvages of the stocking blank extending from heel tab seam 7 to the top of the stocking. During these seaming operations, tails 26 (Fig. III), 39 and 40 (Fig. V) are sewed or bound into the seams to prevent unraveling of the toe and heel seams 8 and 7.

Fig. L presents a diagrammatic view of the last two courses of loops in the tail 39, and also the relative arrangement of loops in a portion of heel tab seam 7. This figure shows how each course of the seaming yarn 38 in heel tab seam 7 is interlooped with one terminal wale loop of each heel tab 4.

If greater strength is desired in the heel tab seam 7, the yarn carrier 37, in each operation, may lay its seaming yarn 38 along more than two needles. For example, the yarn carrier 37 in each operation may lay its seaming yarn 38 along the four needles, NN14, NN15, NN16 and NN17, so that the usual sinkers and dividers will form a loop around each of these four needles after each yarn laying operation. If yarn carrier 37 performs this four needle yarn laying movement in each operation, each of the four needles NN14 through NN17 may be rendered operative by its respective presser bar, or only needles NN15 and NN16 may be rendered operative by their respective presser bars. In the event, all four needles NN14 through NN17 are operative, each transfer finger (35 and 36), in each of its operations, may transfer its respective heel tab terminal loops a distance of two needles, so that each course of seaming yarn 38 will be interknit with two terminal wale loops from each heel tab 4.

If only needles NN15 and NN16 are operative and yarn carrier 37 executes the described four needle movement in each operation, the transfer fingers 35 and 36 may operate as explained in connection with the method first-above described for seaming the heel tabs 4. That is, each transfer finger may travel a distance of one needle in each transfer operation to place a terminal loop of the respective heel tab 4 on one of the needles NN15 and NN16. In each transfer, however, each transfer finger would also transfer a seaming yarn loop to one of the two operative needles. That is, transfer finger 35 in each operation would transfer both a heel tab terminal wale loop and a loop of seaming yarn 38 from needle NN14 to NN15, while transfer finger 36 would be simultaneously transferring a heel tab terminal wale loop and a loop of seaming yarn from needle NN17 to needle NN16. Following each of these transfers, a new row of four loops would be formed on needles NN14 through NN17, after which the previously formed four loops of seaming yarn and two terminal loops would be pressed off needles NN15 and NN16.

The foregoing is only illustrative, and it will be understood that this invention includes all embodiments coming within the scope of the appended claims.

I claim:

1. A method for seaming together at least two edge portions of a full-fashioned stocking blank on the needles of a needle bar, each of said edge portions being formed by a plurality of free terminal wale loops; said method including the steps of providing the terminal wale loops of said edge portions on the needles of said needle bar; interknitting a yarn with the adjacent terminal wale loops of the two edge portions; and then interknitting said yarn with the remainder of said terminal wale loops in a plurality of series of operations; each of said series of operations comprising at least one transfer of loops in one of said edge portions from one group of said needles to another group of said needles, forming a course of loops on a certain group of the needles of said needle bar after each transfer, and pressing off all but the newly formed loops from said last-named group of needles after each course of loops is formed thereon, each of said series of operations having its respective course forming operations performed on a group of needles different from the groups of needles on which the other series of operations have their respective course forming operations performed.

2. In a method of forming a full-fashioned stocking, the steps comprising knitting a stocking blank with certain of its wales terminating in free loops to provide toe edge portions, interknitting yarn with the said free loops to provide a knitted toe seam for said toe edge portions, knitting two heel tabs to the stocking blank with the wales of the heel tabs terminating in free loops at the end of the heel tabs, interknitting a yarn with said heel tab free loops to provide a knitted heel seam for the heel tab ends, and completing the stocking by sewing together the stocking blank edges between said toe and heel knitted seams, and between said heel knitted seam and the top of the stocking.

3. In a method of seaming on needles of a straight knitting machine a flat knit stocking blank having a toe edge portion formed of a course of loops, the outer loops of said edge portion forming two spaced outer loop groups and the remaining loops thereof forming two adjacent inner loop groups, the steps of interknitting yarn with the loops of one outer group and the adjacent inner group to form a knitted seam and interknitting yarn with the loops of the remaining outer and inner groups to form a second knitted seam.

4. A stocking having spaced outer toe edge portions folded into position opposite intermediate toe edge portions, and yarn knitted into loops and interlooped with said outer and intermediate edge portions to form a seam therefor, each of at least a substantial number of said yarn loops being interlooped with one and one only of said edge portions.

5. A method for seaming together at least two edge portions of a full-fashioned stocking blank on the needles of a needle bar, each of said edge portions being formed by a plurality of free terminal wale loops; said method including the steps of providing the terminal wale loops of said edge portions on the needles of said needle bar; interknitting a yarn with the adjacent terminal wale loops of the two edge portions; and then interknitting said yarn with the remainder of said terminal wale loops in a plurality of series of operations; each of said series of operations comprising at least one transfer of loops in one of said edge portions from one group of said needles to another group of said needles, forming a course of loops on a certain group of the needles of said needle bar after each transfer, and pressing off all but the newly formed loops from said last-named group of needles after each course of loops is formed thereon, all said transfer operations being performed only on loops of one of the said two edge portions, and each transfer operation being effective to transfer the transferred loops of said one edge portion toward the loops of the other stocking blank edge portion remaining on the needles.

6. A method for seaming together at least two edge portions of a full-fashioned stocking blank on the needles of a needle bar, each of said edge portions being formed by a plurality of free terminal wale loops; said method including the steps of providing the terminal wale loops of said edge portions on the needles of said needle bar; interknitting a yarn with the adjacent terminal wale loops of the two edge portions; and then interknitting said yarn with the remainder of said terminal wale loops in a plurality of series of operations; each of said series of operations comprising at least one transfer of loops in one of said edge portions from one group of said needles to another group of said needles, forming a course of loops on a certain group of the needles of said needle bar after each transfer, and pressing off all but the newly formed loops from said last-named group of needles after each course of loops is formed thereon, each of a number of said series of operations including two course forming operations on the same group of needles which are so chosen that the first course of the two courses in that series is formed on needles holding loops of one of said edge portions, and the transfer operation preceding the second course forming operation in that series places loops from the other of said edge portions on said chosen needles.

7. In a method of forming a full-fashioned stocking, the steps comprising knitting stocking toe fabric on a row of needles of a straight knitting machine with at least certain of the wales of said stocking toe fabric terminating at an edge thereof in end wale loops, knitting two seaming yarns into said toe fabric during the knitting thereof, and then seaming the opposite outer portions of said toe fabric edge to the inner portions thereof with said seaming yarns in a plurality of series of operations; each of a number of said series of operations including the steps of inwardly transferring loops in said two outermost toe edge portions toward each other and along said needles, forming a course of loops from one of said seaming yarns on a group of said row of needles and a course of loops from the other of said seaming yarns on a group of said row of needles, and then pressing off the loops which were on said two groups of needles before said two seaming courses of loops were formed, each of said number of series of operations interknitting each of said seaming yarns with at least one of said toe edge loops.

8. In a method as recited in claim 7, wherein the first of the plurality of series of seaming operations interknits one seaming yarn with at least one end wale loop of an outer toe edge portion and with at least one end wale loop of an adjacent inner toe edge portion and the other seaming yarn with at least one end wale loop of the other outer toe edge portion and with at least one end wale loop of the other inner toe edge portion.

9. The method of seaming together edge portions of knitted fabric on a straight knitting machine, which method comprises the steps of providing the terminal wale loops in said fabric edge portions on a row of needles of the knitting machine, knitting a plurality of courses of seaming yarn on certain of said needles, and transferring the terminal loops in at least one of said fabric edge portions along said needles between successive seaming yarn course knitting operations, said knitting and said transferring operations being so related that a number of alternate courses of said seaming yarn are interknit with and only with the terminal loops in one of said fabric edge portions and the intervening courses of said seaming yarn are interknit with and only with the terminal loops in the other of said fabric edge portions.

10. A method of seaming together the terminal loops of two groups of wales in knitted fabric by means of a seaming yarn, comprising the steps of providing the two groups of terminal wale loops in adjacent positions on a series of needles, each of said loops being supported on a separate needle; knitting the seaming yarn on needles of said series to provide a plurality of interknitted courses, each course of said yarn being formed and knitted on a group of said needles and the knitting of said courses progressing along those needles on which one of said wale loop groups were provided, whereby one or more courses are formed and knit on one group of needles, one or more courses are formed and knit on another group of needles, and the knitting of courses progresses along the needles to knit said plurality of interknitted courses; and periodically transferring terminal wale loops of the second of said wale loop groups in the direction of progres of said knitting of courses along said needles and toward the terminal wale loops in the said one wale loop group remaining on the needles, said transfer operations alternating with said course forming operations, and each course knitting operation including the step of pressing off from the needles on which such course is formed all but the newly formed loops, each of said terminal wale loops in said two wale loop groups being positioned in the foregoing operations on a seaming yarn knitting needle and pressed off to be interlooped with a seaming yarn loop on such needle.

11. A method of seaming together the terminal loops of the wales in two portions of knitted fabric by means of seaming yarn on a row of needles for supporting said terminal loops, certain of the needles being operative at predetermined times and in predetermined order to perform knitting operations, said method comprising a plurality of series of operations, each of a number of said series of operations including the steps of transferring the terminal loops of one of said portions of knitted fabric along said needles and toward the loops of the second of said portions of knitted fabric, knitting said yarn on a plurality of said needles, and pressing off at least one terminal loop of at least one of said fabric portions from the said last-named needles while said last-named needles retain loops of said yarn, each of said number of series of operations having its knitting of said yarn performed on a different group of said row of needles, said number of series of operations progressing along the needles for supporting the terminal loops of said second portion of knitted fabric.

12. In a method for forming a full-fashioned stocking, the steps comprising knitting stocking toe fabric on a row of needles of a straight knitting machine with at least certain of the wales of the toe fabric terminating at the front edge thereof in free loops forming the last course of the toe fabric, interknitting seaming yarn with said toe fabric during the formation thereof, then knitting said seaming yarn on said needles to form a plurality of courses of loops, and transferring at least certain of said free loops during the formation of said courses of seaming yarn, said knitting and transferring operations effecting interknitting of the free loops in two adjacent portions of said toe front edge with loops of said courses of additional yarn to provide a seam for said two adjacent toe front edge portions.

13. In a method of seaming fabric having a continuous line of loops forming at least part of a course of the fabric, said method being performed on a straight row of needles, said method comprising providing a continuous series of the fabric loops on needles of the row of needles, knitting courses of seaming yarn on needles of said needle row, and periodically transferring loops of one group of the fabric loops along said needle row, said seaming yarn knitting and said loop transferring progressing toward and along the needles of said needle row initially provided with a second group of the fabric loops to interknit the fabric loops of both said one group and said second group with said seaming yarn.

14. In a method as recited in claim 13, wherein each of a plurality of the transferring operations includes the transfer of at least one loop of the seaming yarn.

15. In a method of seaming fabric having a continuous line of loops forming at least part of a course of the fabric, the method being performed on a straight row of needles, said method comprising providing a continuous series of the fabric loops on needles of the row of needles, said series of loops forming two outer loop groups and two inner loop groups, each loop group being supported on a separate group of needles, and then simultaneously and separately joining each of said outer loop groups to the adjacent inner loop group, each outer loop group being joined to the adjacent inner loop group by knitting courses of seaming yarn on needles of said needle row, and periodically transferring loops of the outer loop group along said needle row, said seaming yarn knitting and said loop transferring progressing toward and along the group of needles initially provided with the adjacent inner loop group to interknit the fabric loops of the outer loop group and the inner loop group with the seaming yarn.

16. A method of forming a full-fashioned stocking comprising knitting a stocking blank having two heel fabric portions and toe fabric, knitting courses of seaming yarn and simultaneously therewith interknitting portions of said toe fabric with said seaming yarn to provide a knitted toe seam, knitting a series of courses of seaming yarn and simultaneously therewith interknitting said last-named seaming yarn with both of said heel fabric portions to provide a knitted heel seam, and completing the stocking by joining the opposite stocking blank edges between said knitted toe seam and said knitted heel seam and between said knitted heel seam and the top of the stocking.

17. In a method of forming a full-fashioned stocking, the steps comprising knitting a stocking blank having wales thereof terminating in free loops to provide toe edge portions, knitting courses of seaming yarn and simultaneously therewith interknitting said seaming yarn and said free loops to provide a knitted toe seam for said toe edge portions, knitting two heel tabs to the stocking blank with wales of said heel tabs terminating in free loops at the lower ends of said heel tabs, knitting a series of courses of seaming yarn and simultaneously therewith interknitting said last-named seaming yarn and said heel tab free loops to provide a knitted seam for said heel tab lower ends, and completing the stocking by sewing together the stocking blank edges between said knitted toe seam and said heel tab seam and between said heel tab seam and the top of the stocking.

18. A full-fashioned, machine made, knitted stocking comprising knitted leg, heel, sole, and toe fabric, a knitted seam for said heel fabric, a knitted seam for said toe fabric, each of said seams being formed by seaming yarn having knitted courses extending transversely of the seam and interknit with adjacent stocking edges, and sewed seams for said sole fabric and said leg fabric.

19. In a method of forming the toe of a full-fashioned stocking from stocking toe fabric having a continuous line of loops, said method comprising forming two knitted seams, one of said seams joining an outer group of said loops to an adjacent inner group of said loops, and the other of said seams joining an outer group of the remaining loops of said line to the inner group of loops extending between said first-mentioned inner group and said last-mentioned outer group, each of said seams including the steps of knitting a series of courses of seaming yarn to form a narrow knitted strip, and interknitting said strip with the loops in one of said outer loop groups and the loops in the inner group adjacent thereto.

20. A method as recited in claim 19, wherein the knitting and interknitting in the formation of each seam are begun at the outer end of the corresponding inner group loop and progress toward the inner end of such inner loop group.

21. In a method of seaming a continuous course of end wale loops of a full-fashioned knitted hosiery blank on a straight row of needles of a knitting machine, said method comprising the steps of providing the loops in a portion of the continuous course on a group of the needles in the row of needles, providing the loops of another and adjacent portion of the said course upon a second group of the needles in the row of needles, and knitting a plurality of narrow courses of seaming yarn on needles of said row of needles to form a narrow knitted strip and interknitting said narrow knitted strip with both of said portions of said continuous course during the knitting of said strip.

22. In a method of seaming on a straight row of needles a flat knit blank having an edge portion formed of a course of loops, the outer loops of said edge portion forming two spaced outer loop groups and the remaining loops thereof forming two adjacent inner loop groups, the steps of interknitting yarn with the loops of one outer group and the adjacent inner group to form a knitted seam and interknitting yarn with the loops of the remaining outer and inner groups to form a second knitted seam.

23. In the finishing of a stocking made from a full-fashioned stocking blank having toe fabric with edge portions formed of free terminal wale loops, the method comprising knitting courses of seaming yarn to form knitted material, and joining said edge portions to form a seam therefor by interknitting said terminal wale loops and said knitted material during said seaming yarn course knitting.

24. A full-fashioned stocking having spaced outer toe fabric edge portions folded into position opposite intermediate toe fabric edge portions, and yarn knitted into narrow courses of loops and interknitted with said outer and intermediate edge portions to form a seam therefor, each of said courses extending transversely of said seam.

25. A stocking as recited in claim 24, wherein each narrow course comprises at least two loops of the knitted yarn.

26. A full-fashioned stocking having a fabric section thereof provided with a continuous line of end wale loops, said fabric section being folded with one group of said loops extending along and adjacent a second group of said loops, said one loop group and said second loop group being contiguous parts of said continuous line of loops, and yarn knitted into narrow courses of loops and interknitted with both said one loop group and said second loop group to form a knitted seam therefor, each of said courses of loops extending transversely of said seam.

27. In a full-fashioned, machine made, knitted stocking, knitted fabric portions joined by seaming yarn to form a knitted seam, each of said fabric portions including a row of loops forming at least a part of a course of loops, and said seaming yarn forming a narrow knitted strip of courses of loops, said knitted strip for at least a substantial part of the length of said seam having the alternate strip courses interknit with at least one loop of one of said rows and the intervening strip courses interknit with at least one loop of the other of said rows.

28. A knitted stocking having a continuous toe edge portion formed of terminal wale loops, and knitted seaming yarn comprising a series of courses each interlooped with another course of the yarn and forming a narrow knitted strip having loops thereof interlooped with said terminal wale loops to provide a seam for said toe edge portion.

29. A stocking having a continuous toe edge portion formed of terminal wale loops, and a narrow knitted strip comprising connected courses and having loops thereof interlooped with said terminal wale loops to provide a seam for said toe edge portion, each of a plurality of said strip loops being interlooped with one and one only of the loops in said edge portion.

30. In a full-fashioned, machine made, knitted stocking, knitted fabric portions joined by seaming yarn to form a knitted seam, each of said fabric portions including a row of loops forming at least a part of a course of loops, and said seaming yarn forming a narrow knitted strip of courses of loops, each and every one of the seaming yarn courses in at least a substantial part of the length of said seam being interknit with a loop of each of said row of loops and extending transversely of said seam.

31. A method of joining the terminal wale loops forming the lower end edges of two heel fabric sections of a flat-knit, full-fashioned hosiery blank which comprises the steps of placing the terminal wale loops on a straight row of needles with the loops of one section on one group of the needles and with the loops of the other section on a second group of needles, knitting a seaming yarn on needles of said row to form a narrow knitted strip, and transferring said terminal wale loops onto said last-named needles during the knitting of said strip to interknit said strip and said loops and thereby form a seam for said two heel fabric sections, said strip being formed of connected courses, and each and every course of said strip for the length of said seam being interknitted with at least one terminal wale loop of each of said two heel fabric sections.

32. A method of joining the terminal wale loops forming the lower end edges of two heel fabric sections of a flat-knit, full-fashioned hosiery blank which comprises the steps of placing the terminal wale loops on a straight row of needles with the loops of one section on one group of the needles and with the loops of the other section on a second group of needles, knitting a seaming yarn on needles of said row to form a narrow knitted strip, and transferring said terminal wale loops onto said last-named needles during the knitting of said strip to interknit said strip and said loops and thereby form a seam for said two heel fabric sections, said strip being formed of connected courses, and each and every course of said strip for the length of said seam being formed of at least four loops and being interknitted with two terminal wale loops of each of said two heel fabric sections.

33. The method of seaming together the terminal wale loops of the two heel tabs of a stocking blank which comprises the steps of knitting a plurality of courses of yarn on a group of operative needles intermediate two groups of idle needles to form a tail, then placing the terminal wale loops of said heel tabs on said needles with the adjacent innermost terminal wale loops of the two heel tabs on the operative needles and the remainder of said heel tab terminal wale loops on said idle needles, continuing the said knitting of said yarn on the operative needles for a plurality of successive courses, and transferring certain of said heel tab terminal wale loops to said operative needles prior to each course forming operation in knitting said successive courses until all of said terminal wale loops have been transferred to said operative needles and interknitted with the yarn of said courses, whereby each and every course of said yarn in said seam is interlooped with both of said heel tabs.

34. A method of forming at least part of a full-fashioned stocking on a straight row of needles of a needle bar, the steps comprising knitting two fabric portions on needles of the row of needles and simultaneously therewith knitting a seaming yarn on needles of said row, and joining the knitted fabric portions by continuing the knitting of said seaming yarn on needles of said row and interknitting the knitted seaming yarn with both of said knitted fabric portions during said continued seaming yarn knitting.

35. In a method of forming the heel of a full-fashioned stocking on a straight row of needles of a needle bar, the steps comprising knitting two heel tabs on two spaced groups of needles of said row and simultaneously therewith knitting an end of a seaming yarn into a plurality of connected courses on a group of needles intermediate said two spaced needle groups, and joining said heel tabs by continuing the knitting of said seaming yarn on said intermediate group of needles to form a narrow knitted strip and simultaneously therewith interknitting said narrow knitted strip with both of said heel tabs.

36. In a method of forming and seaming knitted fabric on a row of needles as a continuous operation, said method comprising knitting courses on needles of said row to form knitted fabric, and joining two edge portions of said fabric by knitting narrow courses of yarn on needles of said row and interknitting said yarn with both of said two fabric edge portions during the knitting of said narrow courses, said yarn being a continuation of yarn used in knitting at least part of said knitted fabric.

37. In a method for forming a full-fashioned stocking, the steps comprising knitting a stocking toe on a knitting machine with at least certain of the wales of the toe terminating at the front edge thereof in free loops, knitting an additional yarn into said toe, continuing to knit said additional yarn for a plurality of courses of loops beyond the last course of said toe, and transferring at least certain of said free loops during the formation of said courses of additional yarn, said knitting and transferring operations effecting interknitting of two groups of said free loops with loops of said courses of additional yarn to provide a seam for adjacent front edge portions of said toe.

38. In a method of forming at least part of a full-fashioned stocking on a straight row of needles of a needle bar, the steps comprising knitting fabric on the row of needles with an edge of said fabric formed of terminal wale loops and simultaneously therewith interknitting an end of a seaming yarn with said fabric, and then joining one portion of said edge to another portion of said edge by knitting said seaming yarn on needles of said row and simultaneously therewith interknitting the knitted seaming yarn with the terminal wale loops of both of said edge portions.

39. In a method of forming the toe of a full-fashioned stocking on a straight row of needles of a needle bar, the steps comprising knitting toe fabric on the row of needles with an edge of said fabric formed of terminal wale loops and simultaneously therewith interknitting an end of each of two seaming yarns with said toe fabric; and then forming a seam for said toe fabric edge by knitting said seaming yarns on needles of said row, interknitting one of said seaming yarns with the terminal loops in both an outer portion of said toe edge and an adjacent inner portion of said toe edge, and interknitting the other of said seaming yarns with the terminal loops in both the other outer portion of said toe edge and the inner toe edge portion adjacent thereto.

40. A method as recited in claim 39, wherein knitting of the two seaming yarns is continued after the toe edge seam is formed to interknit one of said seaming yarns with the other of said seaming yarns.

FRANK G. WEISBECKER.